United States Patent
Heo et al.

(10) Patent No.: US 9,615,154 B2
(45) Date of Patent: Apr. 4, 2017

(54) TERMINAL HAVING SPEAKER AND METHOD OF MANUFACTURING THE SAME

(71) Applicant: Samsung Electronics Co., Ltd, Gyeonggi-do (KR)

(72) Inventors: Joon Heo, Gyeonggi-do (KR); Junhui Lee, Gyeonggi-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 276 days.

(21) Appl. No.: 14/150,582

(22) Filed: Jan. 8, 2014

(65) Prior Publication Data

US 2014/0193023 A1 Jul. 10, 2014

(30) Foreign Application Priority Data

Jan. 8, 2013 (KR) ........................ 10-2013-0001940

(51) Int. Cl.
| | |
|---|---|
| *H04R 1/02* | (2006.01) |
| *H01Q 1/22* | (2006.01) |
| *H01Q 1/24* | (2006.01) |
| *H01Q 1/38* | (2006.01) |
| *H04M 1/03* | (2006.01) |

(52) U.S. Cl.
CPC ............ *H04R 1/02* (2013.01); *H01Q 1/2283* (2013.01); *H01Q 1/243* (2013.01); *H01Q 1/38* (2013.01); *H04M 1/03* (2013.01); *H04R 1/023* (2013.01); *H01Q 1/2258* (2013.01); *H04R 1/028* (2013.01); *H04R 2499/11* (2013.01); *Y10T 29/49016* (2015.01)

(58) Field of Classification Search
CPC ................................................. H04R 2499/11
See application file for complete search history.

(56) References Cited

U.S. PATENT DOCUMENTS

| | | | |
|---|---|---|---|
| 8,118,134 B2* | 2/2012 | Burghardt | H04R 1/2842 181/148 |
| 8,838,189 B2* | 9/2014 | Andersen | H01Q 1/243 381/386 |
| 9,042,949 B2* | 5/2015 | Man | H01Q 1/243 455/569.1 |
| 2006/0038733 A1* | 2/2006 | Wedel | H01Q 1/243 343/795 |
| 2006/0089184 A1* | 4/2006 | Kim | H01Q 1/243 455/575.5 |

(Continued)

FOREIGN PATENT DOCUMENTS

WO WO 03/077507 9/2003

OTHER PUBLICATIONS

International Search Report dated Apr. 1, 2014 in connection with International Patent Application No. 13197437.0-1972, 7 pages.

*Primary Examiner* — Matthew Eason (57) ABSTRACT

A terminal includes a first upper carrier including a speaker grill housed as a separate piece in a penetrating hole formed at one surface, and a second upper carrier having an antenna pattern in at least one surface and being coupled to one end of the first upper carrier. A method of manufacturing a terminal having a speaker device, comprises forming a penetrating hole to house the speaker device at one surface of a first upper carrier, coupling a speaker grill to the penetrating hole, forming an antenna pattern at one surface of a second upper carrier separated from the first upper carrier and coupling the first upper carrier and the second upper carrier.

20 Claims, 7 Drawing Sheets

(56) References Cited

U.S. PATENT DOCUMENTS

| | | | | |
|---|---|---|---|---|
| 2007/0123294 A1* | 5/2007 | Lee | ................ | H01Q 1/22 |
| | | | | 455/550.1 |
| 2007/0242848 A1* | 10/2007 | Yang | ................ | H04R 1/021 |
| | | | | 381/386 |
| 2008/0095394 A1* | 4/2008 | Yoon | ................ | H01Q 1/22 |
| | | | | 381/386 |
| 2008/0144879 A1* | 6/2008 | Yang | ................ | H04M 1/03 |
| | | | | 381/386 |
| 2008/0268925 A1* | 10/2008 | Tang | ................ | H01Q 1/2258 |
| | | | | 455/575.7 |
| 2009/0201219 A1* | 8/2009 | Ryou | ................ | H01Q 1/243 |
| | | | | 343/904 |
| 2009/0304223 A1* | 12/2009 | Chang | ................ | H04R 9/025 |
| | | | | 381/412 |
| 2010/0316246 A1* | 12/2010 | Cho | ................ | H01Q 1/243 |
| | | | | 381/386 |
| 2012/0088542 A1* | 4/2012 | Choi | ................ | H01Q 1/52 |
| | | | | 455/554.2 |
| 2012/0252535 A1* | 10/2012 | Kajiwara | ................ | H04M 1/03 |
| | | | | 455/566 |
| 2013/0033401 A1* | 2/2013 | Kim | ................ | H04M 1/035 |
| | | | | 343/702 |
| 2013/0070952 A1* | 3/2013 | Mai | ................ | H04R 1/028 |
| | | | | 381/394 |
| 2013/0109329 A1* | 5/2013 | Na | ................ | H01Q 9/0442 |
| | | | | 455/73 |
| 2014/0112523 A1* | 4/2014 | Mai | ................ | H04R 1/028 |
| | | | | 381/388 |
| 2014/0210675 A1* | 7/2014 | Hwang | ................ | H01Q 1/44 |
| | | | | 343/702 |
| 2015/0130670 A1* | 5/2015 | Vin | ................ | H01Q 1/22 |
| | | | | 343/702 |

* cited by examiner

TERMINAL HAVING SPEAKER AND METHOD OF MANUFACTURING THE SAME

CROSS-REFERENCE TO RELATED APPLICATION(S) AND CLAIM OF PRIORITY

The present application is related to and claims the benefit under 35 U.S.C. §119(a) of a Korean patent application No. 10-2013-0001940 filed on Jan. 8, 2013 in the Korean Intellectual Property Office, the entire disclosure of which is hereby incorporated by reference.

TECHNICAL FIELD

The present disclosure relates to a terminal having a speaker device and a method of manufacturing the same, and more particularly, to a terminal having a speaker device and a method of manufacturing the same that secure front radiation space of a speaker within the same space by relieving spatial restriction on X, Y, and Z-axes and that prevent the speaker from being damaged in an antenna plating process.

BACKGROUND

Portable wireless communication terminals such as a mobile phone and a personal digital assistant (PDA) should essentially include an antenna. An antenna of the portable wireless communication terminal is generally a removable antenna protruded to the outside of a main body of a terminal, but nowadays, according to the trend of decrease in size of the terminal, use of a built-in antenna provided at the inside of a main body of the terminal increases. Hereinafter, an internal antenna is referred to as an intenna.

For example, in an intenna such as planar inverted F antenna (PIFA), one contact point is connected to an RF connector of a main board of a terminal and another contact point is connected to a ground layer of the main board. In such a structure, electromagnetic resonance space to secure an enough bandwidth is provided, and in order to exhibit excellent radiation characteristics, an antenna should be fully separated from a ground layer. Due to such a reason, the intenna is installed on a predetermined carrier and secures a distance from a ground layer.

In order for a portable wireless communication terminal to perform a basic communication function, the portable wireless communication terminal should essentially include a speaker. As well known, the speaker is formed with a magnet, voice coil, and diaphragm. When a current flows to a voice coil under a magnetic force line formed by the magnet, a lorentz force occurs. As the voice coil vibrates the diaphragm by the lorentz force, air contacting with the diaphragm vibrates and thus a sound wave occurs. In general, in order for a speaker to secure excellent performance, the speaker has acoustic resonance space.

When the intenna and the speaker are together installed within the terminal, a size and a thickness of the terminal increase. Therefore, nowadays, technologies of using electromagnetic resonance space of the intenna as acoustic resonance space of the speaker by mounting the speaker at the inside of an intenna carrier are introduced. However, the approach of coupling the speaker and the intenna has the following problem.

In a speaker structure, because a housing surface to receive a speaker grill separately exists within the speaker structure, in a total thickness of the speaker, a thickness of the housing surface cannot be ignored. That is, because a thickness of a speaker within a mobile terminal has a limitation, resonance space of a front surface of the speaker decreases due to a thickness of the housing surface.

Figure 1:
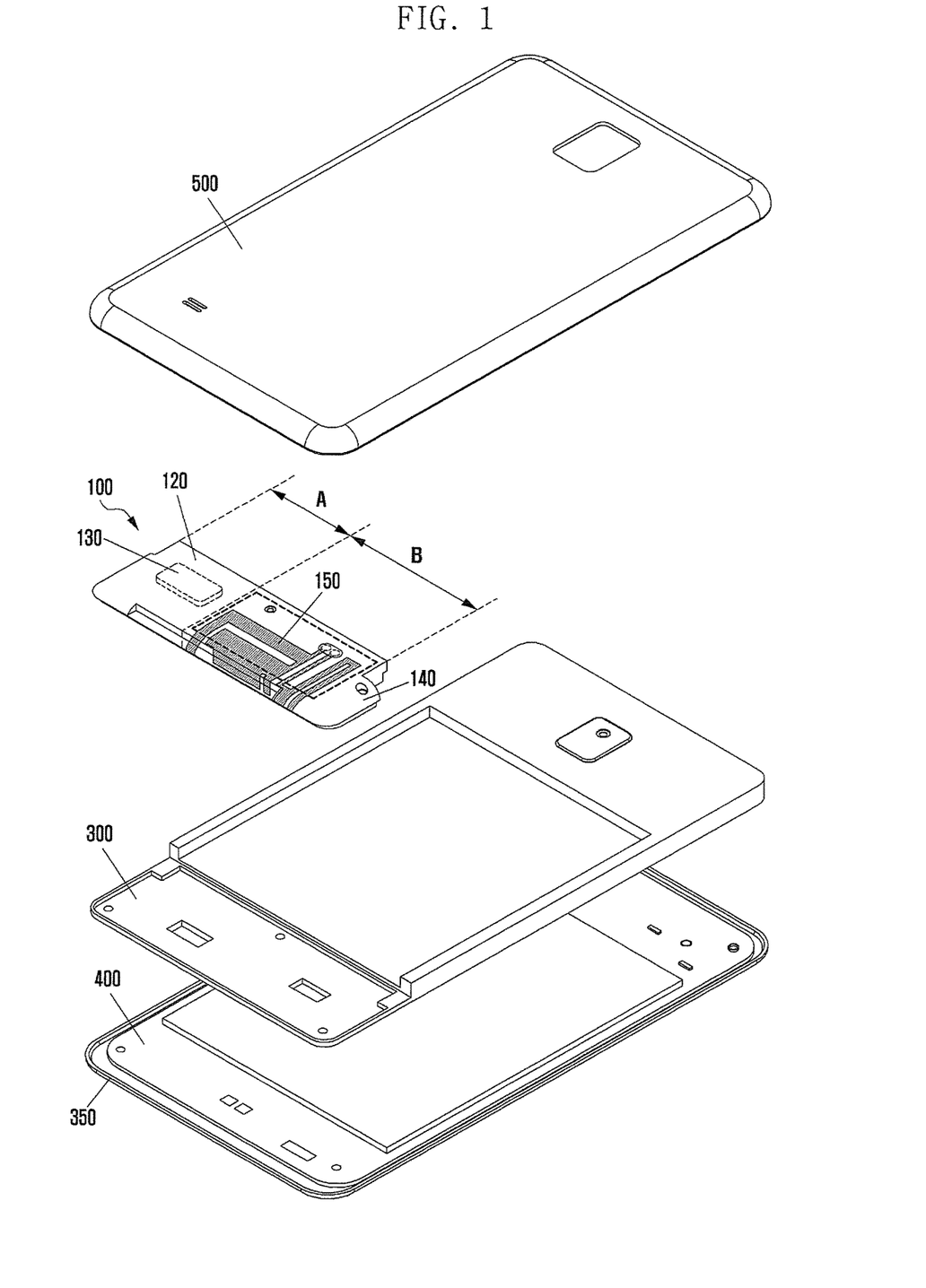
FIG. 1 is a perspective view illustrating a speaker and intenna device before and after coupling.

FIG. 1 is a perspective view illustrating a speaker and intenna device before and after coupling.

Referring to FIG. 1, a speaker grill 13 and an intenna 15 are formed in an upper part of an integral carrier 10, and the intenna 15 is formed by metal plating on the upper part of an integral carrier 10. The upper part of an integral carrier 10 is coupled to a lower part of an integral carrier 14.

Here, in a process of plating the intenna 15 adjacent to the speaker, the speaker grill 13 may be plated and thus a problem of a performance failure and external appearance quality deterioration of the speaker grill 13 may occur.

SUMMARY

To address the above-discussed deficiencies, it is a primary object to provide a terminal having a speaker device and a method of manufacturing the same that secure front surface radiation space of a speaker within the same space by relieving spatial restriction on X, Y, and Z-axes and that prevent a speaker from being damaged in an antenna plating process.

In accordance with an aspect of the present disclosure, a terminal having a speaker device includes: a first upper carrier including a speaker grill housed as a separate piece in a hole formed at one surface; and a second upper carrier having an intenna pattern in at least one surface and coupled to one end of the first upper carrier.

In accordance with another aspect of the present disclosure, a method of manufacturing a terminal includes: forming a penetrating hole to house a speaker device at one surface of a first upper carrier; coupling a speaker grill to the penetrating hole; forming an intenna pattern at one surface of a second upper carrier separated from the first upper carrier; and coupling the first upper carrier and the second upper carrier.

In accordance with another aspect of the present disclosure, a terminal includes: a speaker that houses a speaker grill as a separate piece in a hole formed in a first upper carrier and that includes a mesh and a soundproof port in a lower portion of the speaker grill; an antenna provided at one surface of a second upper carrier coupled to one end of the first upper carrier; and a lower carrier coupled to a lower portion of the first and second upper carriers to embody acoustic resonance space of the speaker.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, exemplary embodiments of the present disclosure are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present disclosure.

In the present disclosure, a speaker device can be provided to a portable electronic device such as a mobile phone, smart phone, tablet PC, and laptop PC having the same as a component.

In an exemplary embodiment of the present disclosure, a speaker device can be applied to information and communication devices and multimedia devices such as a television (TV), tablet PC, mobile communication terminal, mobile phone, personal digital assistant (PDA), smart phone, international mobile telecommunication 2000 (IMT-2000) terminal, code division multiple access (CDMA) terminal, wideband code division multiple access (WCDMA) terminal, global system for mobile communication (GSM) terminal, general packet radio service (GPRS) terminal, enhanced data GSM environment (EDGE) terminal, universal mobile telecommunication service (UMTS) terminal, digital broadcasting terminal, and automated teller machine (ATM), and applications thereof.

In a speaker device according to an exemplary embodiment of the present disclosure, by housing a speaker grill in a penetrating hole of an upper carrier, but by enabling a lower surface of the speaker grill to position at the same parallel line as a lower surface of the upper carrier, spatial restriction on X, Y and Z-axes of a speaker device of the mobile terminal is relieved and front radiation space of a speaker can be secured within the same space.

Further, in a speaker device provided in a mobile terminal according to the present exemplary embodiment, by separating and individually forming a first upper carrier to mount the speaker device and a second upper carrier to mount the antenna device and by cohering the first upper carrier and the second upper carrier, in a process of plating an intenna adjacent to a speaker, a speaker grill is prevented from being plated and thus a performance and an external appearance quality of the speaker grill can be improved.

Figure 2:
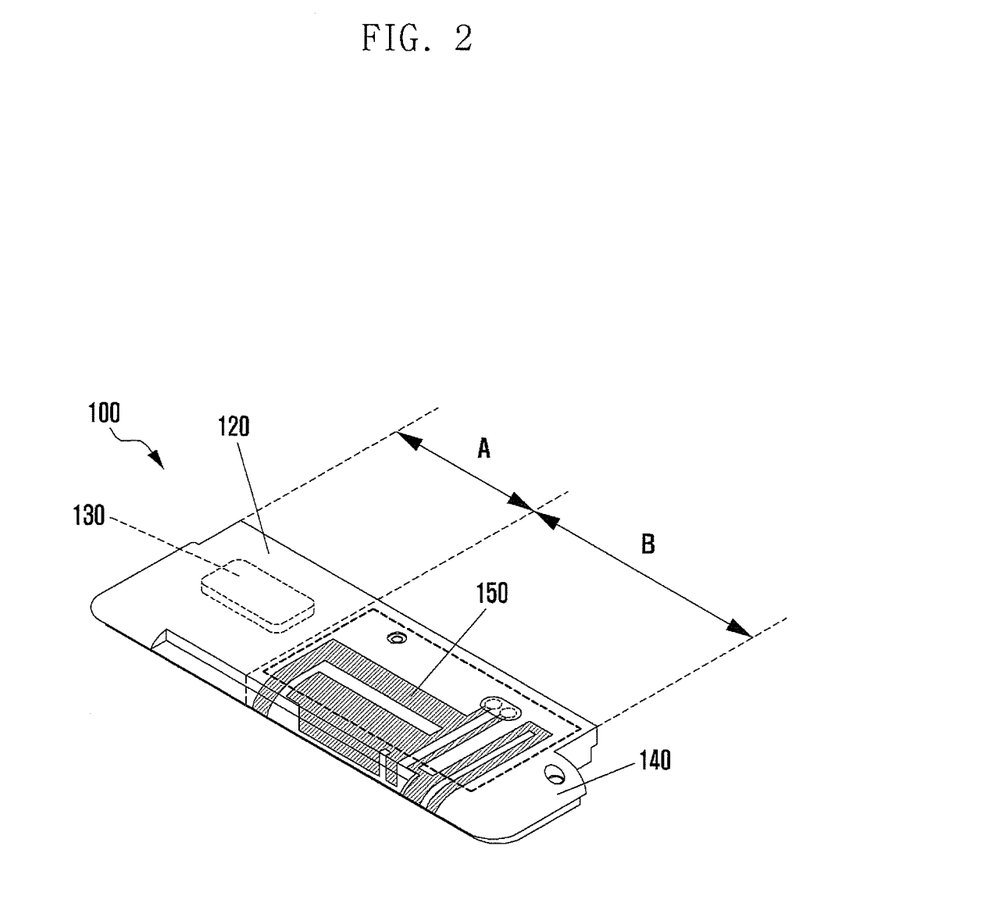
FIG. 2 is a perspective view illustrating a mobile terminal including a speaker intenna coupling device according to an embodiment of the present disclosure.

FIG. 2 is a perspective view illustrating a mobile terminal including a speaker intenna coupling device according to an exemplary embodiment of the present disclosure.

Referring to FIG. 2, a speaker device according to the present exemplary embodiment illustrates an example provided in a mobile terminal of a bar form, but can be applied to a mobile terminal of various structures such as a slide type, folder type, swing type, and swivel type having a speaker device and an application form of the speaker device is not limited thereto.

The mobile terminal can include a front case 350 and a rear case 300 as a case forming an external appearance. At least one intermediate case can be additionally disposed between the front case 350 and the rear case 300, and at space formed between the front case 350 and the rear case 300, various electronic components can be housed.

The front case 350 and the rear case 300 can be formed by injecting a synthetic resin or can be made of a metal material such as stainless steel (SUS) or titanium (Ti).

Although not shown in FIG. 2, in the front case 350, a display unit, receiver, camera, microphone, and input unit can be provided. The display unit is formed with a common display device such as a liquid crystal display (LCD) and visually outputs various information provided to a user.

The input unit is formed with a common input device such as a keypad, touchpad, and jog and generates an input signal according to a user's manipulating action.

A printed circuit board (PCB) 400 can be provided between the front case 350 and the rear case 300. At one surface or both surfaces of the PCB 400, various electronic elements can be mounted, and the PCB 400 is electrically connected to a speaker intenna coupling device 100 to output audio data or a voice/sound signal through a speaker device 130. Further, the PCB 400 is electrically connected to an antenna device to process a wireless signal corresponding to a wireless electromagnetic wave transmitted and received by an intenna device 150.

In the rear case 300, the speaker intenna coupling device 100 and a battery pack (not shown) according to the present exemplary embodiment can be mounted. FIG. 1 illustrates an example in which the speaker intenna coupling device 100 is disposed in a lower portion of the mobile terminal, but a mounting position of the speaker intenna coupling device 100 and the battery pack is not limited thereto.

The battery pack houses a battery that supplies power to the mobile terminal and can be freely coupled to a main body and be separated from a main body.

In an upper portion of the rear case 300, a battery cover 500 that covers the battery can be provided. The battery cover 500 is provided as an example of a case that forms an external appearance of the mobile terminal and can cover a rear surface of the mobile terminal.

The speaker intenna coupling device 100 according to the present exemplary embodiment is installed at the inside of the mobile terminal and is electrically connected to the PCB 400.

The speaker intenna coupling device 100 is a structure in which an upper carrier, lower carrier, the speaker device 130, and intenna device 150 are coupled, and a coupling method and an assembling order are described in detail with reference to the drawings.

Figure 3:
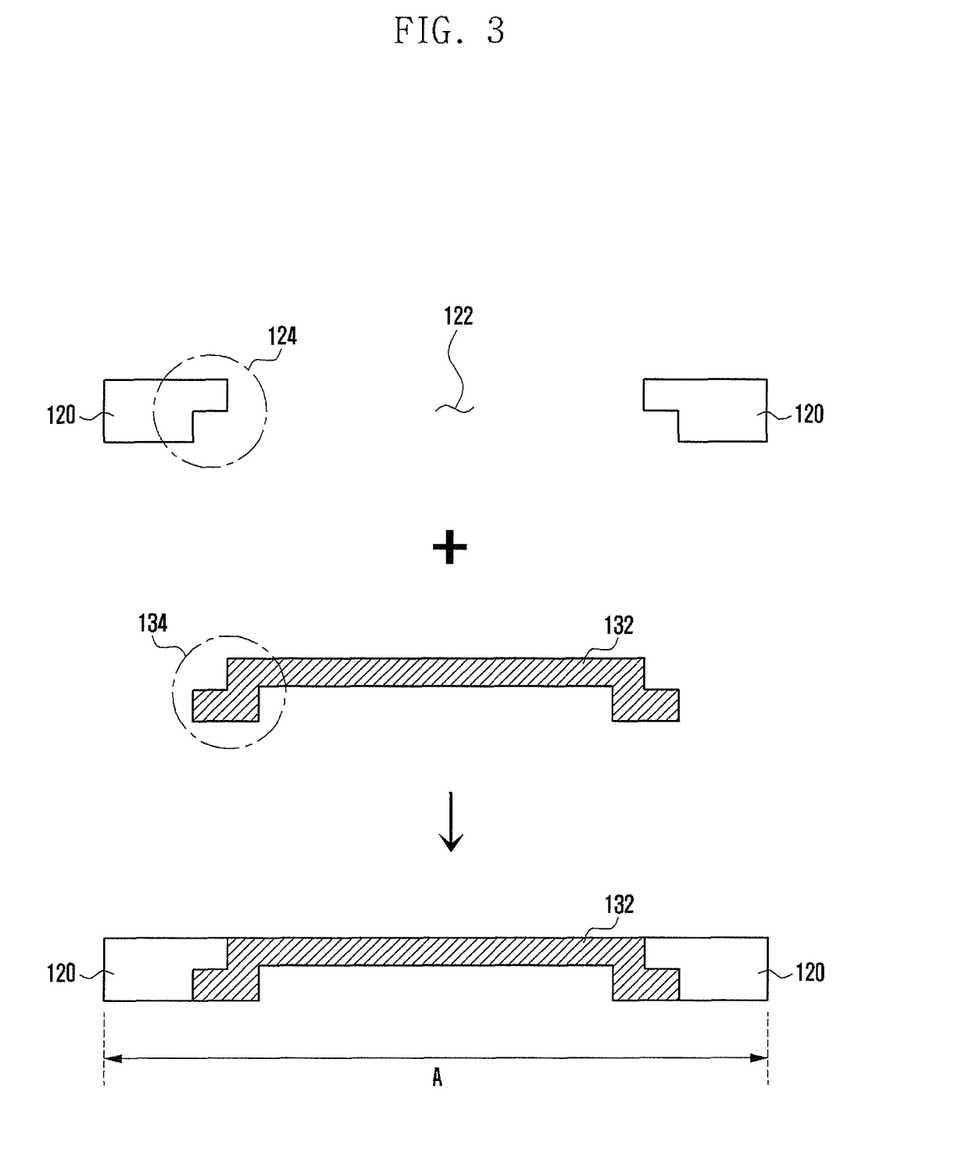
FIG. 3 is a perspective view illustrating the speaker intenna coupling device of FIG. 2.

FIG. 3 is a perspective view illustrating the speaker intenna coupling device of FIG. 2.

Referring to FIG. 3, the speaker intenna coupling device 100 according to the present exemplary embodiment can be formed with the speaker device 130 provided in a first upper carrier 120 and the intenna device 150 provided in the second upper carrier 140.

The speaker device 130 of the speaker intenna coupling device 100 can be provided in a speaker device area A, and the intenna device 150 can be provided in an intenna device area B.

In the speaker device area A and the intenna device area B, the speaker device 130 and the intenna device 150 can be separated by a predetermined gap so that the speaker device 130 and the intenna device 150 may not have an electrical influence on each other.

Specifically, at an upper surface of the first upper carrier 120 shown in FIG. 3, an upper surface portion of a speaker grill 132 (see FIG. 5) of the speaker device 130 can penetrate a portion of the first upper carrier 120.

At an upper surface and a side surface of the second upper carrier 140, an intenna pattern can be provided as the intenna device 150.

When activating a communication function of the mobile terminal, the intenna device 150 performs a function of emitting a signal to transmit to air and receiving a signal radiated to air.

A plurality of intenna patterns can be provided in the second upper carrier 140 and can be provided in at least one intenna of an antenna having a frequency band of 1.56 GHz or more such as Bluetooth (BT), global positioning system (GPS), and WiFi, a main antenna performing communication of global system for mobile communications (GSM), code division multiple access (CDMA), and wideband code division multiple access (WCDMA), and a diversity antenna.

The intenna device 150 can use a single band antenna having a form of a monopole antenna in which a ground line is not connected or a single band antenna having a form of a PIFA antenna in which a ground line is connected at a position of a periphery of a power supply line. If the intenna device 150 has a form of a PIFA antenna, even when the intenna device 150 uses in the same frequency band, a size of an antenna can be further reduced.

The intenna device 150 can be provided in the second upper carrier 140 adjacent to the first upper carrier 120 having the speaker grill 132, but can be provided at a lower carrier 142 (see FIG. 7), the PCB 400, and the inside and the outside of the mobile terminal, and a mounted position of the intenna device 150 may not be limited thereto.

Particularly, the first upper carrier 120 according to the present exemplary embodiment can function as a structure of supporting the speaker device 130 so as to mount the speaker device 130 at the inside of the terminal. The first upper carrier 120 and the second upper carrier 140 separately include the speaker grill 132 and the intenna device 150, respectively, and one end of the first upper carrier 120 and one end of the second upper carrier 140 can have a coupled structure.

That is, by penetrating a portion of the first upper carrier 120, the speaker grill 132 is mounted in the first upper carrier 120, and after the intenna device 150 is patterned at one surface of the second upper carrier 140 separated from the first upper carrier 120, by cohering one end of the first upper carrier 120 and one end of the second upper carrier 140, the first and second upper carriers 120 and 140 embodying the speaker intenna coupling device 100 can be formed.

In a lower end portion of the first upper carrier 120 and the second upper carrier 140, the lower carrier 142 separated by a predetermined gap and coupled to the first and second upper carriers 120 and 140 can be provided. The lower carrier 142 (see FIG. 7) can perform a function of supporting the speaker intenna coupling device 100.

The lower carrier 142 can be formed by cohering at least one separated lower carrier and can be formed in an integral form structure, as in the upper carriers 120 and 140.

The upper carriers 120 and 140 and the lower carrier 142 can be provided by injecting an injection material melted by a high temperature into an injection mold. Alternatively, the upper carriers 120 and 140 and the lower carrier 142 can be formed with a plurality of plastic shaping methods such as rotating powder shaping, molding, and cold dipping shaping in addition to the injection molding.

In the speaker intenna coupling device 100 according to an exemplary embodiment of the present disclosure, an upper carrier is formed in an integral form, and a speaker device and an intenna device are provided in an upper carrier of an integral form, and the speaker device 130 and the intenna device 150 are formed in each of the separated first upper carrier 120 and second upper carrier 140, respectively, and a structure of cohering the first upper carrier 120 and the second upper carrier 140 and a method of producing the first upper carrier 120 and the second upper carrier 140 are described in detail with reference to FIG. 3.

Figure 4:
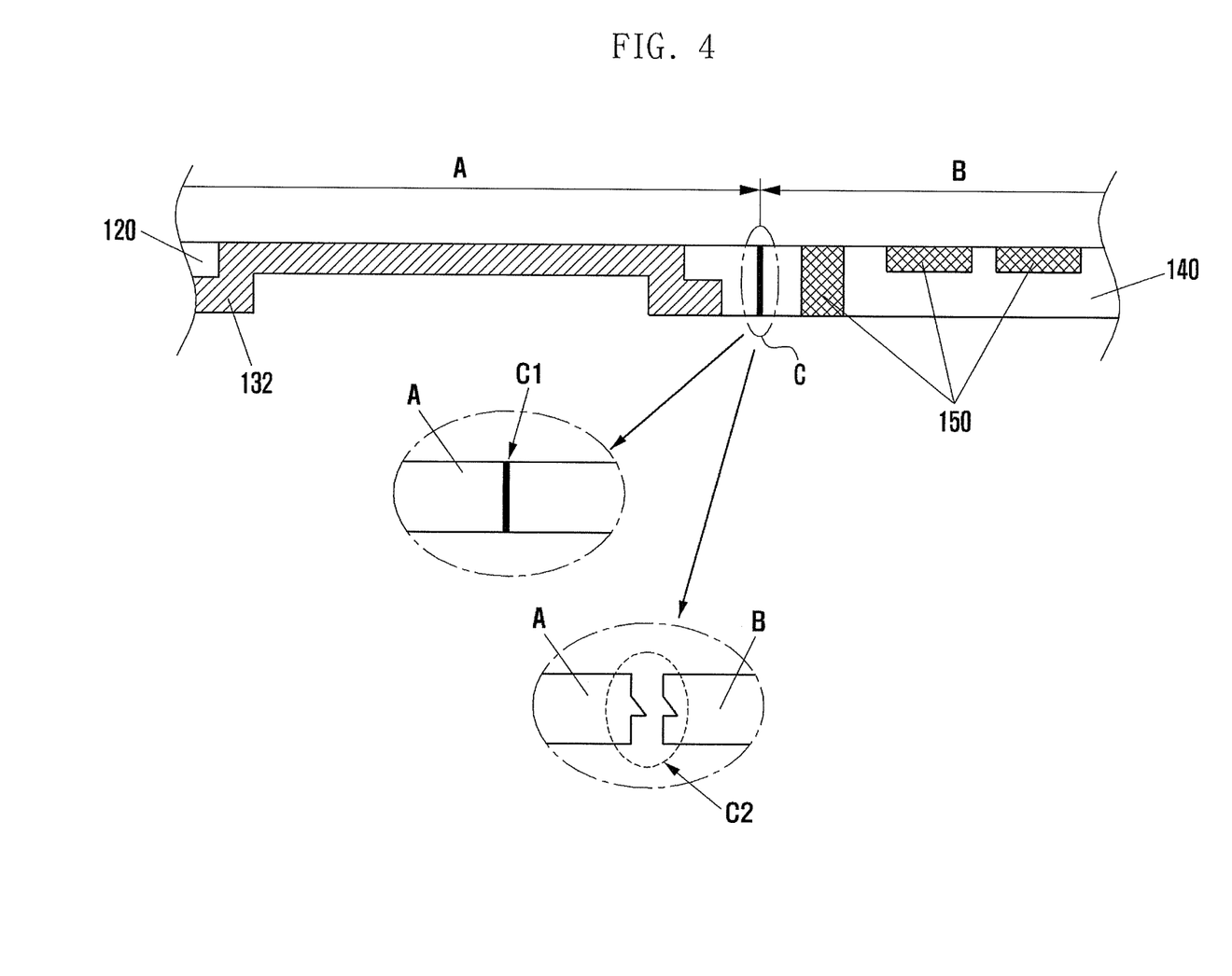
FIG. 4 is a cross-sectional view illustrating some of a production process for forming a speaker device according to an embodiment of the present disclosure.

FIG. 4 is a cross-sectional view illustrating some of a production process of forming a speaker device according to an exemplary embodiment of the present disclosure.

Referring to FIG. 4, the first upper carrier 120 of a speaker device according to the present exemplary embodiment includes a penetrating hole 122 to house the speaker grill 132 at one surface thereof, and a circumference 124 of an inner wall of the penetrating hole 122 is formed in a multistage structure of a perpendicular line and thus enlarges a contact surface with the speaker grill 132, thereby embodying a stable supporting structure. The penetrating hole 122 can be a hole that simultaneously penetrates an upper surface and a lower surface of the first upper carrier 120 to the outside.

The first upper carrier 120 can be formed by injecting an injection material melted by a high temperature in an upper carrier injection mold. Alternatively, the first upper carrier 120 can be formed with a plurality of plastic shaping methods such as rotating powder shaping, molding, and cold dipping shaping in addition to the injection molding.

At an upper surface of the speaker grill 132, a plurality of through-holes 138 (see FIG. 7) can be uniformly drilled. Sound/voice can be output to the outside through the through-hole 138.

The speaker grill 132 can be formed by injecting a synthetic resin or can be made of a metal material such as stainless steel (SUS) or titanium (Ti).

An edge circumference 134 of the speaker grill 132 has a structure to be coupled to an inner wall circumference 124 of the penetrating hole 122 of the first upper carrier 120 and can be formed in a structure corresponding to a form of the inner wall circumference 124 of the penetrating hole 122.

That is, an outer edge circumference of the speaker grill 132 can be formed in a multistage structure corresponding to a multistage structure of the inner wall circumference 124 of the penetrating hole 122 or can be formed in a straight line type wall structure corresponding to a straight line type wall structure of the penetrating hole 122. The present exemplary embodiment illustrates an example in which an edge circumference of the speaker grill 132 is formed in a multistage structure, but a structure of an edge circumference of the speaker grill 132 is not limited thereto.

A multistage structure of the speaker grill 132 can be a structure, i.e., a stair type multistage structure in which a lower end portion is further protruded to an outer edge in a plane than an upper end portion. Alternatively, a multistage structure of the speaker grill 132 can be a structure, i.e., an inverse stair type multistage structure in which an upper end portion is further protruded to an outer edge in a plane than a lower end portion.

The speaker grill 132 formed in this way is combined to the penetrating hole 122 of a multistage structure of the first upper carrier 120, and thus an upper end portion of the speaker device 130 can be complete. In this case, an edge circumference of the speaker grill 132 and the inner wall circumference 124 of the penetrating hole 122 can be combined by at least one method of ultrasonic bonding, thermo compression, soldering, adhesive bonding, hook, and hook home fastened to the hook.

A lower surface of the speaker grill 132 can be provided on the same horizontal line as that of the first upper carrier 120. An upper surface of the speaker grill 132 can be protruded further than a height of the first upper carrier 120 or can be provided in the same height as that of the first upper carrier 120, and a height of the upper surface of the speaker grill 132 is not limited thereto.

In this way, as the speaker grill 132 according to the present exemplary embodiment is coupled to the penetrating hole 122 of the first upper carrier 120, a thickness that can be embodied on a Z-axis can offset a thickness of a structure to support the speaker grill 132 within the limited speaker device 130.

Thereby, spatial restriction on a Z-axis line of the speaker device 130 can be relieved, and front surface radiation space L (see FIG. 6) having a great influence on a performance of the speaker device 130 can be further secured.

Figure 5:
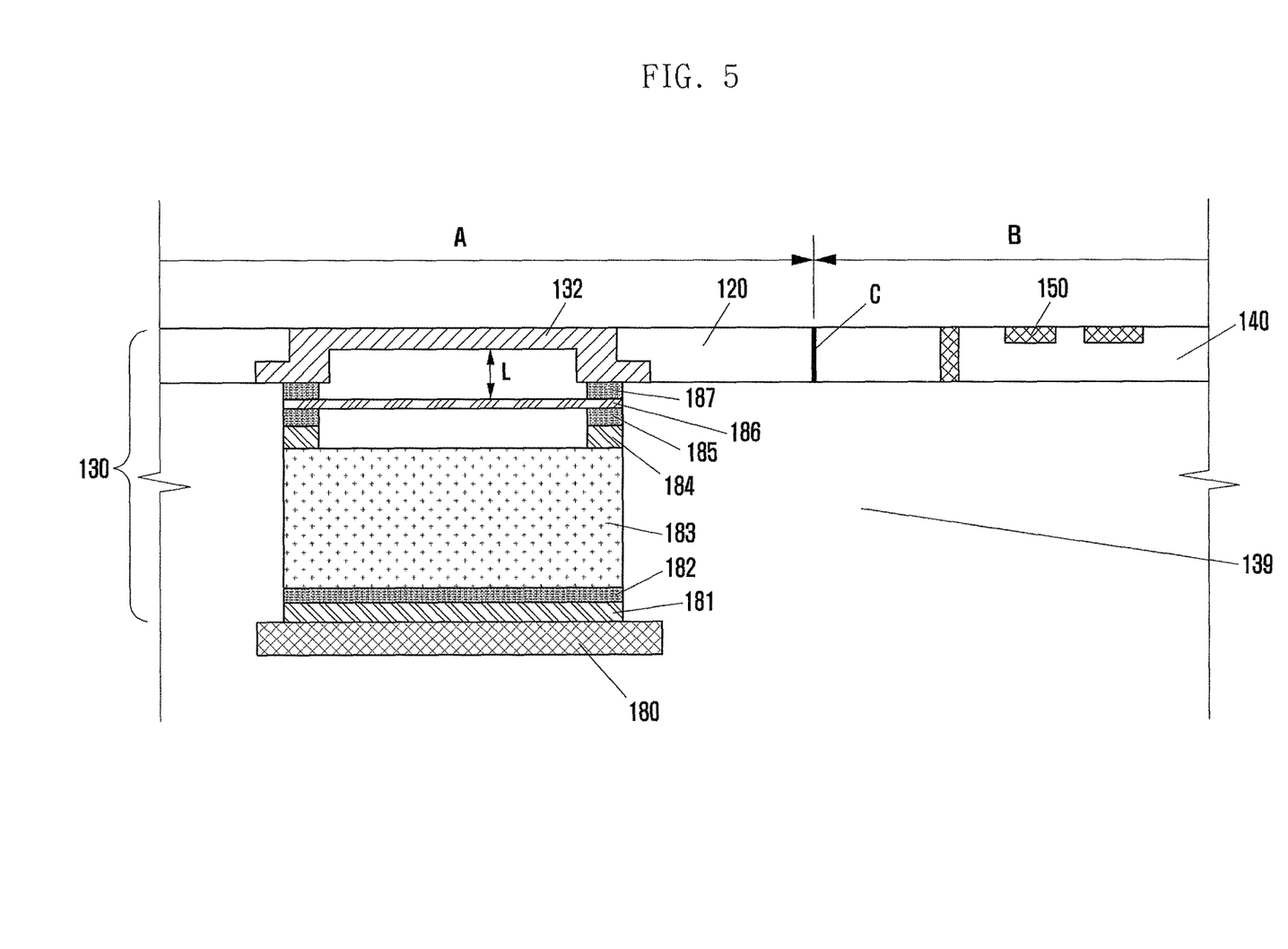
FIG. 5 is a cross-sectional view illustrating a speaker intenna coupling device in which a speaker device and an intenna device are coupled according to an embodiment of the present disclosure.

FIG. 5 is a cross-sectional view illustrating a speaker intenna coupling device in which a speaker device and an intenna device are coupled according to an exemplary embodiment of the present disclosure.

Referring to FIG. 5, before the first upper carrier 120 and the second upper carrier 140 are combined, the intenna device 150 can be provided at one surface of the second upper carrier 140.

The second upper carrier 140 can be provided by injecting an injection material melted by a high temperature into an injection mold. Alternatively, the second upper carrier 140 can be formed with a plurality of plastic shaping methods such as rotating powder shaping, molding, and cold dipping shaping in addition to the injection molding.

The intenna device 150 can be formed by a plating layer using copper (Cu) or nickel (Ni) in at least one surface of a side surface, upper surface, rear surface, front surface, and/or a combination thereof of the second upper carrier 140.

As described above, after the first upper carrier 120 and the second upper carrier 140 are separated and particularly, the intenna device 150 is formed in the second upper carrier 140, the first upper carrier 120 and the second upper carrier 140 can be coupled in an integral form structure.

Specifically, as one end of the first upper carrier 120 to which the speaker grill 132 is coupled and one end of the second upper carrier 140 in which the intenna device 150 is formed are combined, the first upper carrier 120 and the second upper carrier 140 can be coupled.

Here, one end of the first upper carrier 120 and one end of the second upper carrier 140 can be combined by at least one method of ultrasonic bonding, thermo compression, soldering, adhesive bonding, and/or a combination thereof, as in a first cohesion area C1.

Alternatively, one end of the first upper carrier 120 and one end of the second upper carrier 140 can be combined by a coupling structure such as a hook and a hook home fastened to the hook, as in a second cohesion area C2, and a method of coupling the first upper carrier 120 and the second upper carrier 140 is not limited thereto.

Figure 6:
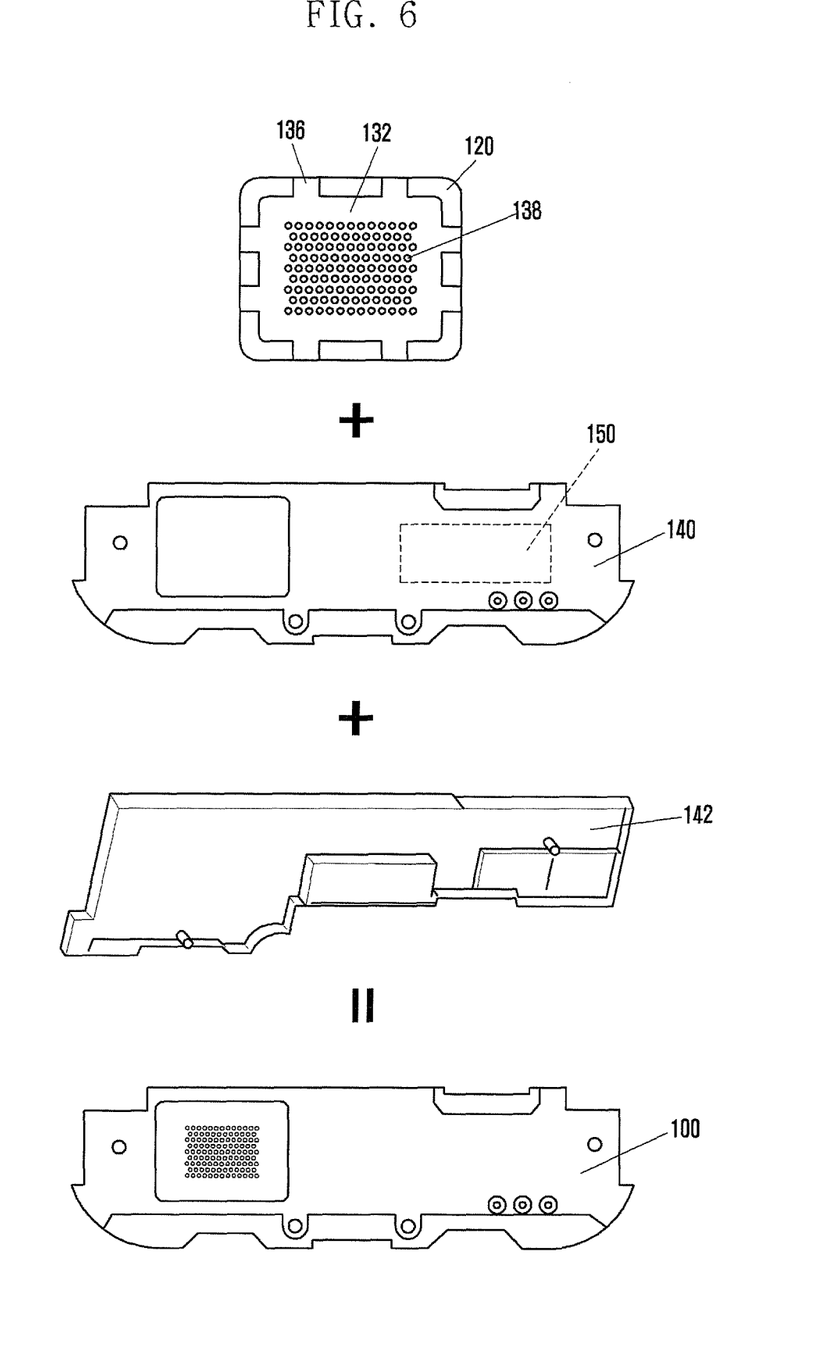
FIG. 6 is a cross-sectional view illustrating a speaker intenna coupling device in which a speaker device and an intenna device are coupled according to an embodiment of the present disclosure.
Figure 7:
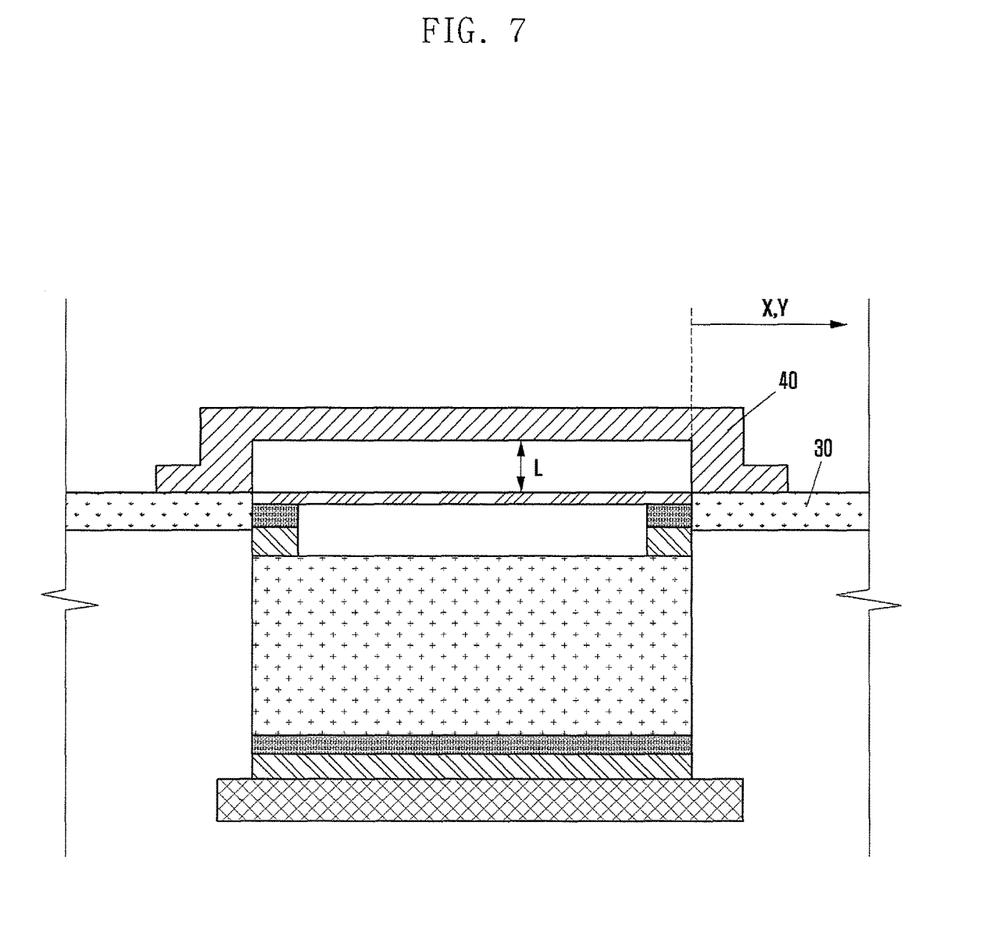
FIG. 7 is a perspective view illustrating a speaker intenna coupling device in which a speaker device and an intenna device are coupled according to an embodiment of the present disclosure.

FIG. 6 is a cross-sectional view illustrating a speaker intenna coupling device in which a speaker device and an intenna device are coupled according to an exemplary embodiment of the present disclosure, and FIG. 7 is a perspective view illustrating a speaker intenna coupling device in which a speaker device and an intenna device are coupled according to an exemplary embodiment of the present disclosure.

Referring to FIGS. 6 and 7, the speaker grill 132 of the speaker device 130 according to the present exemplary embodiment can be coupled to the first upper carrier 120, and an intenna pattern of the intenna device 150 can be provided at one surface of the second upper carrier 140 coupled to the first upper carrier 120.

Referring to FIG. 7, the speaker grill 132 is a thin plate in which many holes are formed, can be produced using a synthetic resin or steel, is positioned at a front surface of a speaker device, and outputs sound through the hole. In this case, a shape of the hole is not limited to a circle and can be formed in, for example a rectangular shape or an oval shape.

The speaker grill 132 can be received as a separate piece at the penetrating hole 122 formed at one surface of the first upper carrier 120. At an edge circumference of the speaker grill 132, a surface bonded to the first upper carrier 120 is formed in, for example an uneven structure 136 having predetermined bending to extend a contact surface with the first upper carrier 120. The uneven structure 136 can be a plane line structure at an edge of the speaker grill 132. For reference, a structure on a perpendicular line of an edge of the speaker grill 132 was described as a multistage structure 134 in a description of FIG. 4.

In this way, the speaker grill 132 extends a contact surface with the first upper carrier 120 through the multistage structure 134 on a perpendicular line and an uneven structure 136 on a plane and thus the speaker grill 132 can be more stably mounted in the first upper carrier 120.

The first upper carrier 120 and the second upper carrier 140 can be coupled in parallel on the same plane, one ends thereof can be coupled to overlap, and portions of one ends can be coupled to overlap on the same perpendicular line, as shown in FIG. 6, but a coupling position of the first upper carrier 120 and the second upper carrier 140 is not limited thereto.

In a lower portion of the first upper carrier 120 and the second upper carrier 140, the lower carrier 142 can be provided with separated by a predetermined gap, and the lower carrier 142 can be provided in an integral form or in a separated form and can have a structure coupled in an integral form like the first upper carrier 120 and the second upper carrier 140.

The remaining structures constituting the speaker device 130 can be formed between the first upper carrier 120 and the lower carrier 142 to which the speaker grill 132 is coupled. For example, structures such as a mesh 186 and a soundproof port 183, except for the speaker grill 132 can be provided from an upper portion of a speaker lower end portion 180 to a lower end portion of the speaker grill 132 using a component such as double-sided tapes 182, 185, and 187 and porons 181 and 184. The speaker lower end portion 180 can be made of a material such as stainless steel (SUS) or titanium (Ti).

Internal space 139 between the first upper carrier 120 and the second upper carrier 140 and the lower carrier 142 can be used as speaker acoustic resonance space and can be used as electromagnetic resonance space of the intenna device 150.

In this way, the lower carrier 142 is coupled to the first upper carrier 120 and the second upper carriers 140 including the mesh 186 and the soundproof port 183.

Particularly, in an exemplary embodiment of the present disclosure, by coupling a speaker grill to the penetrating hole 122 formed in the first upper carrier 120 and by supporting the speaker grill 132 in the first upper carrier 120, it is unnecessary to increase an entire thickness so as to mount a structure that supports the speaker device 130 and thus space of the Z-axis can be further secured.

Further, because it is unnecessary to extend an area on an X-axis and a Y-axis for a structure that supports the speaker device 130, by relieving spatial restriction on the X, Y, and Z-axes, radiation space L of a front surface of the speaker device area A within the same space can be secured.

Further, in the speaker intenna coupling device 100, after separately forming the speaker device 130 and the intenna device 150 at each of the separated first upper carrier 120 and second upper carrier 140, because the first and second upper carriers 120 and 140 are combined, in a process of plating an intenna adjacent to a speaker provided in an upper part of an integral carrier, a speaker grill can be prevented from being plated and thus a performance and an external appearance quality of the speaker grill can be improved.

In the speaker device 130 according to the present exemplary embodiment, the speaker grill 132 is coupled to the penetrating hole 122 formed in the upper carrier 120 and thus the speaker device area A is supported by the upper carrier 120.

By such a structure, because it is unnecessary that the speaker device 130 according to the present exemplary embodiment provides a structure such as a housing surface to mount the speaker grill 132 at the lower side or the upper side of the speaker grill 132, there is a merit that saved space on a Z-axis can be secured as front surface radiation space L. Further, there is a merit that it is unnecessary to extend and mount a speaker grill and a structure to support the speaker grill to an X-axis and a Y-axis from the speaker device.

Although not shown in the drawings, in the upper carriers 120 and 140 and the lower carrier 142, structures of several forms can be additionally formed. For example, at an upper surface of the second upper carrier 140, structures that help coupling to the intenna device 150 can be formed, and at a lower surface thereof, structures that help coupling to the lower carrier 142 can be formed.

Similarly, at an upper surface of the lower carrier 142, structures that help coupling to the first and second upper carriers 120 and 140 can be formed, and at a lower surface thereof, structures that help coupling to the PCB 400 can be formed. In addition, a form and detailed structure of the upper and lower carriers 120, 140, and 142 can be changed by several design factors.

As described above, in a terminal having a speaker device and a method of manufacturing the same according to the present disclosure, by coupling a speaker grill to a penetrating hole formed in an upper carrier, a thickness added for a structure to support an existing speaker device can be secured, and thus by relieving a spatial restriction on X, Y and Z-axes, front surface radiation space of the speaker can be secured within the same space.

Further, by separating and combining a carrier to house a speaker device and a carrier to house the antenna device, in a process of plating an intenna adjacent to a speaker, a speaker grill is prevented from being plated and thus a performance and an external appearance quality of the speaker grill can be improved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A terminal comprising:
   a first upper carrier comprising a speaker grill housed as a separate piece in a penetrating hole formed at one surface of the first upper carrier; and
   a second upper carrier having an antenna pattern in at least one surface and configured to couple to one end of the first upper carrier,
   wherein the second upper carrier is coupled to and inseparable from the one end of the first upper carrier by a coupling structure that coheres a side surface of the second upper carrier to a side surface of the one end of the first upper carrier.

2. The terminal of claim 1, wherein a circumference of an inner wall of the penetrating hole has a multistage structure, and an outer edge circumference of the speaker grill has a multistage structure corresponding to the multistage structure of the penetrating hole.

3. The terminal of claim 1, wherein a portion of the coupling structure includes a hook and a remainder of the coupling structure includes a hook home configured to fasten to the hook, and
   wherein the side surface of the one end of the first upper carrier includes one of the hook and the hook home, and
   wherein the side surface of the second upper carrier includes the other one of the hook and the hook home.

4. The terminal of claim 1, further comprising a lower carrier separated by a predetermined gap in a lower end portion of the first upper carrier and the second upper carrier.

5. The terminal of claim 1, wherein an upper surface of the speaker grill has one of a structure protruded further than an upper surface of the first upper carrier and a structure formed in a same plane as the upper surface of the first upper carrier.

6. The terminal of claim 1, wherein the speaker grill is coupled to an inner wall of a penetrating hole of the first upper carrier by at least one method, or a combination of ultrasonic bonding, thermo compression, soldering, adhesive bonding, hook, and hook home fastened to the hook.

7. The terminal of claim 1, wherein the first upper carrier and the second upper carrier are combined by at least one method, or a combination of ultrasonic bonding, thermo compression, soldering, adhesive bonding, hook, and hook home fastened to the hook.

8. A method of manufacturing a terminal having a speaker device, the method comprising:
forming a penetrating hole to house the speaker device at one surface of a first upper carrier;
coupling a speaker grill to the penetrating hole;
forming an antenna pattern at one surface of a second upper carrier separated from the first upper carrier; and
coupling the first upper carrier and the second upper carrier by a coupling structure that coheres a side surface of the second upper carrier to a side surface of one end of the first upper carrier.

9. The method of claim 8, wherein forming the penetrating hole comprises forming a circumference of an inner wall of the penetrating hole in a multistage structure.

10. The method of claim 9, wherein an outer edge circumference of the speaker grill is formed in a multistage structure corresponding to a multistage structure of the penetrating hole.

11. The method of claim 8, further comprising coupling a lower carrier separated by a predetermined gap in a lower end portion of the first upper carrier and the second upper carrier.

12. The method of claim 8, wherein coupling a speaker grill comprises coupling a speaker grill to an inner wall of a penetrating hole of the first upper carrier using at least one method, or a combination of ultrasonic bonding, thermo compression, soldering, adhesive bonding, hook, and hook home fastened to the hook.

13. The method of claim 8, wherein coupling the first upper carrier comprises coupling the first upper carrier and the second upper carrier to at one end of the first upper carrier and one end of the second upper carrier using at least one method, or a combination of ultrasonic bonding, thermo compression, soldering, adhesive bonding, hook, and hook home fastened to the hook.

14. The method of claim 8, wherein a portion of the coupling structure includes a hook and a remainder of the coupling structure includes a hook home configured to fasten to the hook, and
wherein the side surface of the one end of the first upper carrier includes one of the hook and the hook home, and
wherein the side surface of the second upper carrier includes the other one of the hook and the hook home.

15. A terminal, comprising:
a speaker configured to house a speaker grill as a separate piece in a hole formed in a first upper carrier and comprising a mesh and a soundproof port in a lower portion of the speaker grill;
an antenna provided at one surface of a second upper carrier coupled to and inseparable from one end of the first upper carrier, wherein the second upper carrier is configured to couple to the one end of the first upper carrier, and wherein the second upper carrier is coupled to the one end of the first upper carrier by a coupling structure that coheres a side surface of the second upper carrier to a side surface of the one end of the first upper carrier; and
a lower carrier coupled to a lower portion of the first and second upper carriers to embody acoustic resonance space of the speaker.

16. The terminal of claim 15, wherein a portion of an edge of the speaker grill is provided on a same Z-axis line as that of the mesh and the soundproof port.

17. The terminal of claim 16, wherein front surface radiation space of the speaker is formed between the speaker grill and the mesh.

18. The terminal of claim 15, wherein a circumference of an edge of the speaker grill is formed in an uneven structure on a plane and is formed in a multistage structure on a perpendicular line.

19. The terminal of claim 15, wherein a portion of the coupling structure includes a hook and a remainder of the coupling structure includes a hook home configured to fasten to the hook, and
wherein the side surface of the one end of the first upper carrier includes one of the hook and the hook home, and
wherein the side surface of the second upper carrier includes the other one of the hook and the hook home.

20. The terminal of claim 1, further comprising a rear case that includes:
a front surface configured to be disposed proximate to a back surface of a printed circuit board (PCB), and
a back surface configured to be disposed proximate to a back cover of the terminal, wherein the back surface includes a first recess configured to mount the first and second upper carriers, and a second recess configured to mount to a battery pack.

* * * * *